United States Patent [19]

Kulischenko et al.

[11] 4,184,576

[45] Jan. 22, 1980

[54] POWER DRIVEN FLEXIBLE SHAFT CLUTCH ASSEMBLY

[75] Inventors: Walter Kulischenko, East Brunswick; William C. Ellis, Bridgewater, both of N.J.

[73] Assignee: Pennwalt Corporation, Philadelphia, Pa.

[21] Appl. No.: 883,110

[22] Filed: Mar. 3, 1978

[51] Int. Cl.² .............................................. F16D 7/02
[52] U.S. Cl. ..................................... 192/41 R; 64/29; 192/41 S
[58] Field of Search ...................... 192/41 R, 43, 43.2, 192/41 S, 79, 80; 64/29, 2 R

[56] References Cited

U.S. PATENT DOCUMENTS

| | | | |
|---|---|---|---|
| 2,619,860 | 12/1952 | Gray | 64/2 R X |
| 2,824,434 | 2/1958 | Stern | 64/27 NM X |
| 2,868,001 | 1/1959 | Russell | 192/80 X |
| 2,909,047 | 10/1959 | Walterscheid-Muller et al. | 64/29 |
| 3,233,053 | 2/1966 | Parks | 192/41 R X |
| 3,347,062 | 10/1967 | Schumann et al. | 64/29 X |
| 3,429,639 | 2/1969 | Peters | 64/29 X |
| 3,574,878 | 4/1971 | Shames et al. | 64/29 X |
| 3,860,108 | 1/1975 | Farfaglia | 64/29 X |
| 4,112,708 | 9/1978 | Fukuda | 64/2 R |

*Primary Examiner*—Rodney H. Bonck

[57] ABSTRACT

Clutch assembly which couples rotary motion from an output shaft of a high speed power source to a flexible shaft when the output shaft rotates in the desired direction. Power driven flexible shafts which are subjected to torque loads should desirably be rotated in one direction only. Thus, a flexible shaft having its outermost layer of wire coiled in one direction should be rotated in that direction which tightens up the coiled wire in that layer, and not rotated in the other direction. The clutch consists of a 3-component assembly comprising a cylindrical split spring clip, an input bearing or member, and an output bearing or member. The split spring clip interconnects the input member, which usually receives one end of the power driven flexible shaft; and the output member, which is connected to and rotates the spindle of a suitable handpiece tool. The split spring clip is provided with a tongue and a lip which respectively engage a slot, and a detent or sloping face, provided on the input member to cause the split spring clip to rotate therewith in accordance with the high speed output shaft to which the input member is connected. The lip also engages a detent or sloping surface provided on the output member to cause rotation thereof if the input member and split spring clip are rotating in the proper direction, in which case rotary motion will be coupled to the handpiece tool.

1 Claim, 5 Drawing Figures

POWER DRIVEN FLEXIBLE SHAFT CLUTCH ASSEMBLY

Statement of the Invention

The present invention relates to clutches and more particularly to a three-component clutch assembly for use with power driven rotatable flexible shafts to insure positive control of direction of rotation thereof.

BACKGROUND OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control in either direction of rotation.

A power driven flexible shaft has maximum torque capacity when operated in the direction which tightens up its outermost layer of wires. When operated in the opposite direction, torque capacity is reduced by about 20 to 50%. Therefore, for clockwise driving, a left-lay shaft should be used. Alternatively, a right-lay shaft should be employed for counterclockwise driving.

The present invention provides a simple, inexpensive clutch assembly for use with power driven left or right-lay flexible shafts subjected to a torque load to provide positive rotational directional control to the flexible shaft or, if recommended, the clutch assembly may be readily "reversed" as will be described hereinafter, to permit both clockwise and counterclockwise directions of rotation of the rotatable flexible shaft.

DETAILED DESCRIPTION OF THE INVENTION

Figure 1:
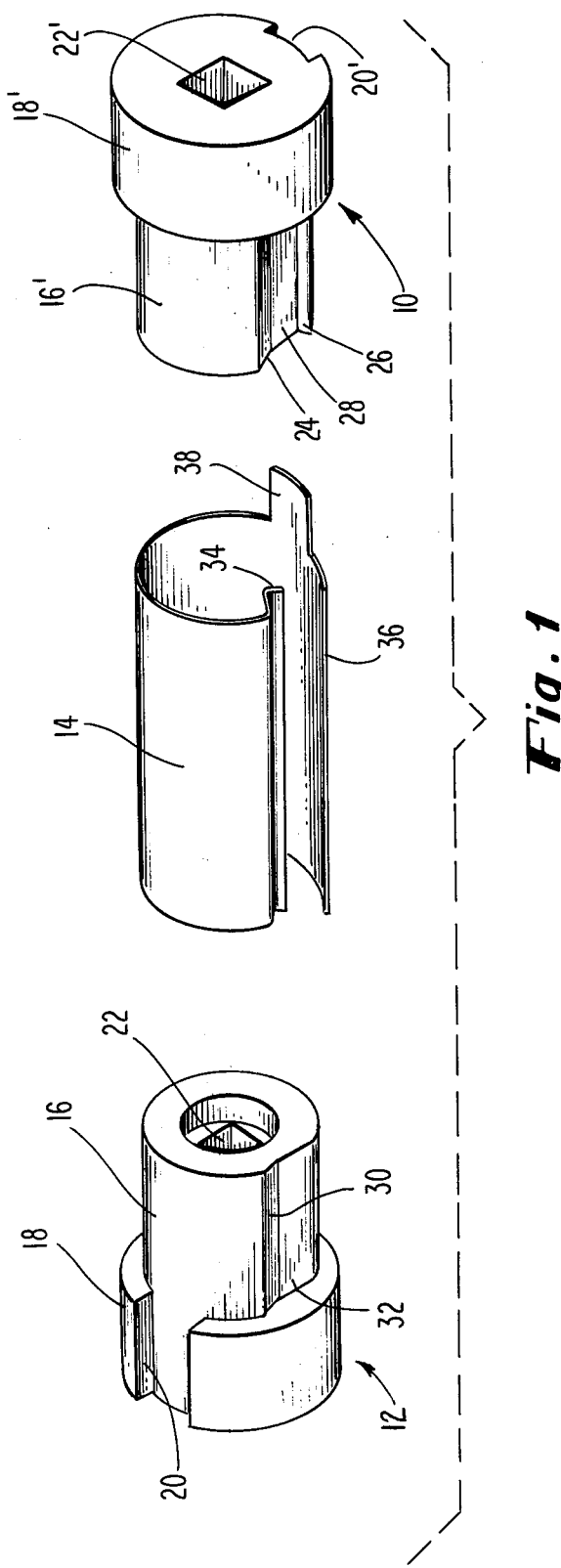
FIG. 1 is an exploded view, in perspective, of an embodiment of the invention.

Referring to FIG. 1, a 3-component clutch assembly for use with power driven flexible shafts comprises an input bearing or member 10, output bearing or member 12, and a split spring clip 14 which resiliently interconnects the two.

Output member 12 comprises inner hub 16 concentric with outer hub 18 of larger diameter. Outer hub 18 is provided with a transverse slot 20. Outer hub 18 has a drive square 22 centrally therewithin which extends into inner hub 16. Drive square 22 receives the spindle of a suitable handtool, for example, such as a portable grinder.

Thus far, output member 12 is identical with input member 10, i.e., input member 10 includes inner hub 16', outer hub 18', slot 20', and driven square 22'. Drive square 22' receives an end of the flexible shaft which is readily formed into an accurate square which mates the broached or swaged square hole or drive square 22' in input member 10.

Figure 2:
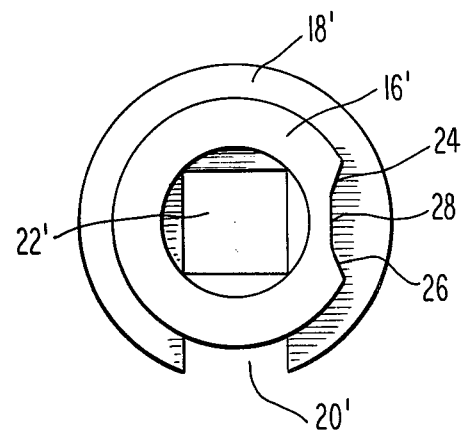
FIGS. 2 and 3 are front elevation views of the input and output members respectively of the embodiment shown in FIG. 1.
Figure 3:
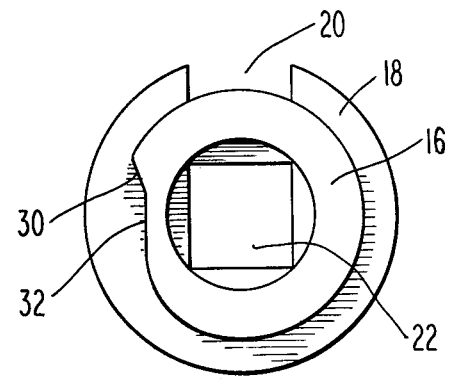

Each inner hub is provided with a longitudinal recessed portion which forms a detent area, which detent area of inner hub 16' of input member 10 includes a pair of opposed downwardly sloping faces 24 and 26 forming a flat surface 28 therebetween, shown clearly in FIG. 2. The detent area of inner hub 16 of output member 12 however includes only a single sloping face 30, identical with either of the sloping faces of inner hub 16'. Sloping face 30 terminates in a flat surface 32, which, in turn, merges with outer surface of inner hub 16 (FIG. 3).

Figure 4:
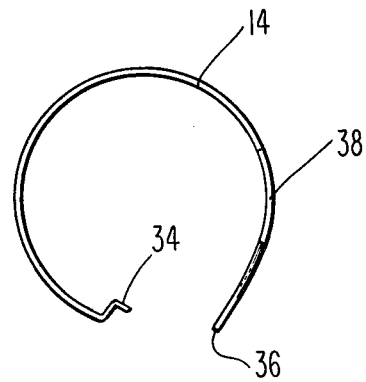
FIG. 4 is an end elevation view of the split spring clip of the embodiment shown in FIG. 1.

Split spring clip 14 forms an inturned lip 34 at one of its longitudinal edges, which lip is capable of engaging any of the sloping faces of either inner hub, while free edge 36 of split spring clip 14 does not engage any sloping face. Split spring clip 14 is provided with a tongue 38 which protrudes from a side edge, intermediate lip 34 and free edge 36, shown in FIGS. 1 and 4. Coaction between sloping faces and lip; and tongue and slots will be later described.

Figure 5:
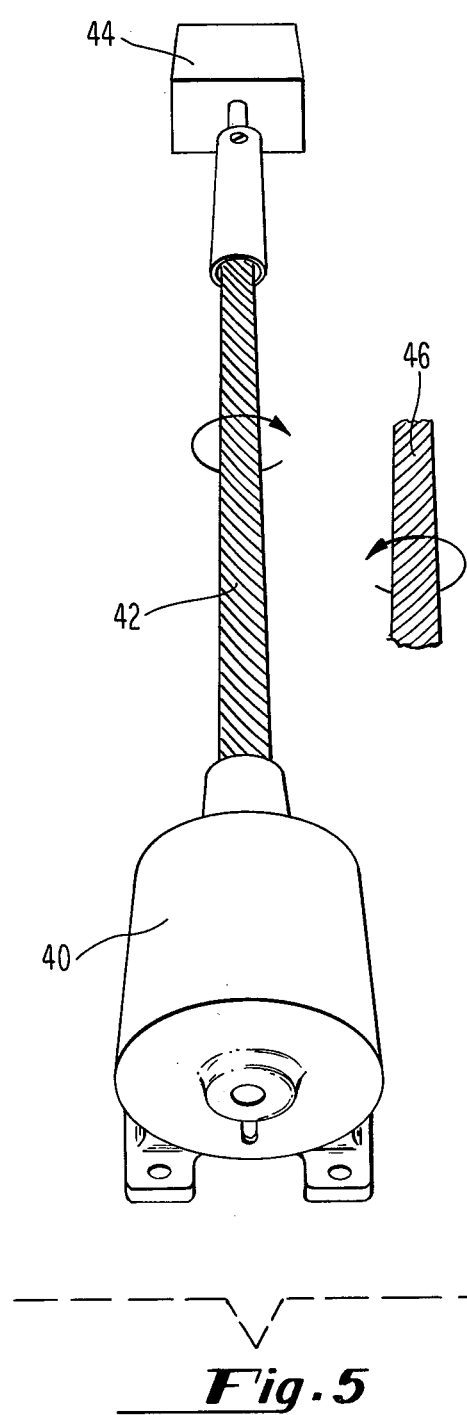
FIG. 5 illustrates a power driven left-lay and right-lay rotatable flexible shaft.

Reference is now made in FIG. 5 wherein a power source 40 causes flexible shaft 42 to rotate therewith at high speeds, i.e., about 1000 to 3600 rpm, although smaller sized flexible shafts have been operated successfully with the present clutch assembly at considerably greater speeds. Flexible shaft 42 is connected to a suitable member or element 44 to be driven, such as a portable grinding or buffing tool, drill, reamer, polishing or sanding disc, and the like.

Flexible shaft 42 is illustrated as a left-lay flexible shaft and therefore will be rotated in a direction which tightens its outermost layer of wires if torque capacity of the shaft is not to be substantially reduced. Thus, shaft 42 will be rotated in a clockwise direction. Conversely, shaft 46 is a right-lay flexible shaft and should be rotated in a counterclockwise direction. The direction of rotation of power driven flexible shafts is customarily determined from the power source end of the flexible shaft.

If the power source 40 is a reversible electric motor, for example, having an output shaft adapted to be received by input member drive square 22'; and shaft 42 is a left-lay flexible shaft, then the present coupling device or clutch mechanism will be assembled in a manner which will prevent rotation of flexible shaft 42, under a torque load, in a counterclockwise direction. Thus, split spring clip 14 will receive inner hub 16' by sliding lip 34 along flat surface 28 which will automatically bring tongue 38 into operable engagement with slot 20'. Inner hub 16 of output member 12 will then be inserted into other end of split spring clip 14 by sliding lip 34 along flat surface 32. The handpiece tool spindle will then be inserted into output member drive square 22 and the flexible shaft squared end inserted into drive square 22' of input member 10. The other end of the flexible shaft will be operably connected to the high speed rotating output shaft.

Thus, output member 12 will not rotate in a counter-clockwise direction as lip 34 will merely slide around inner hub 16 of output member 12 since no sloping surface or detent is available for lip 34 to engage.

Under special circumstances, a power driven flexible shaft may be rotated in both directions. In such case, by merely reversing split spring clip 14, tongue 38 will engage slot 20 of output member 12. Now, regardless of the direction of rotation of input member 10, output member 12 will rotate in accordance therewith by virtue of engagement of tongue 38 with slot 20.

It will also be appreciated that output member 12 may be provided with a single face which slopes in a direction opposite to that shown in the drawings. A driven member connected thereto will now rotate only in a counterclockwise direction. Of course, a right-lay flexible shaft will accordingly be employed.

It should be further appreciated that the present clutch assembly may be operably connected directly to an output shaft of a suitable high speed power source. One end of a flexible shaft will then be connected to the output member 12, rather than to input member 10, and a handpiece tool connected to the other end of the flexible shaft. In such an application, the present clutch assembly will again positively prevent misdirectional rotation of both the flexible shaft and handpiece spindle.

Additionally, by merely varying the tenacity of the split spring clip member, the clutch assembly may be caused to "slip" when a specified torque loading is exceeded.

We claim:

1. In a system for coupling power from a rotating output shaft of a high speed power source to a driven member to be driven thereby through rotatable flexible shaft means having a plurality of layers of closely coiled wire wound over a mandrel, each of said layers of wire being wound in alternately opposing directions, the improvement therewith of a 3-component clutch assembly for controllably coupling said power from said rotating output shaft; said 3-component clutch assembly providing positive control of directional rotation of said flexible shaft means, said 3-component clutch assembly comprising an input bearing member operably connected to one end of said flexible shaft means, other end of said flexible shaft means being connected to said rotating output shaft, an output bearing member operably connected to said driven member, said input and output bearing members having detent areas thereon, a split spring clip operably interconnecting said bearing members, said split spring clip having a lip disposed across a longitudinal edge thereof, said detent areas of said bearing members being engaged by said lip when said input bearing member is rotated in one direction to cause said split spring clip and output bearing member to rotate therewith, and another detent area of said input bearing member is engaged by said lip when said input bearing member is rotated in the other direction to cause said split spring clip to rotate therewith whereby a flat surface adjacent said detent area of said output member permits said split spring clip to slip about said output member while said split spring clip rotates with said input bearing member in said other direction, each of said input and output bearing members comprising an inner hub concentrically disposed to an outer hub of larger diameter, each of said outer hubs having a transverse slot provided thereacross, each of said inner hubs of said input bearing member and said output bearing member being provided with said detent areas, said detent area of said inner hub of said input bearing member comprising a pair of opposed substantially identical downwardly sloping faces, said downwardly sloping faces providing a flat surface therebetween, and said detent area of said output bearing member comprising a single downwardly sloping face terminating in a flat surface merging with outer surface of said inner hub.

* * * * *